United States Patent [19]

Reeve et al.

[11] Patent Number: 4,727,492

[45] Date of Patent: Feb. 23, 1988

[54] VEHICLE CONTROL AND GUIDANCE SYSTEM

[75] Inventors: Peter J. Reeve; Michael P. Robins, both of Warwickshire; Malcolm T. Roberts, West Midlands, all of England

[73] Assignee: The General Electric Company, p.l.c., England

[21] Appl. No.: 584,598

[22] Filed: Feb. 29, 1984

[30] Foreign Application Priority Data

May 14, 1983 [GB] United Kingdom ............... 8313338

[51] Int. Cl.$^4$ .................... G06F 15/50; G05D 1/02
[52] U.S. Cl. .................... 364/424; 364/450; 364/571; 180/169
[58] Field of Search ............ 364/443, 444, 449, 450, 364/424, 559, 561, 571, 457; 180/167–169; 356/1, 4, 141, 152

[56] References Cited

U.S. PATENT DOCUMENTS

| | | | |
|---|---|---|---|
| 3,845,289 | 10/1974 | French | 364/444 |
| 4,049,961 | 9/1977 | Marcy | 180/169 |
| 4,225,226 | 9/1980 | Davidson et al. | 364/449 |
| 4,328,545 | 5/1982 | Halsall et al. | 180/167 |
| 4,403,291 | 9/1983 | Von Tomkewitsch | 364/444 |

Primary Examiner—Gary Chin
Attorney, Agent, or Firm—Kirschstein, Kirschstein, Ottinger & Israel

[57] ABSTRACT

A vehicle control and guidance system in which a desired route for the vehicle is stored in the vehicle in the form of co-ordinates in a ground reference frame. The 'vectors' between these junction points are divided by successive reference points into incremental vectors, the reference points being generated ahead of the vehicle at regular intervals. A dead reckoning system predicts the position of the vehicle at the end of each interval and this estimate is corrected, using a Kalman filter, by an independent fixed-target detection system using a scanning laser. The error between the estimated vehicle position and the local incremental vector provides a steering angle correction for the vehicle and the vehicle speed is dependent upon the lag of the vehicle behind the generation of reference points.

22 Claims, 13 Drawing Figures

VEHICLE CONTROL AND GUIDANCE SYSTEM

BACKGROUND OF THE INVENTION

1. Field of the Invention

This invention relates to a vehicle control and guidance system in which one or more vehicles each having its own motive power and steering capability can be accurately moved within a predetermined area.

2. Description of Related Art

Although the position of a vehicle at particular locations can be precisely determined using on-board sensors and external position markers, difficulties arise in trying to control accurately the movement of a vehicle between these particular locations in a smooth and economical fashion. Generally, an unmanned vehicle is constrained to move along predetermined paths, using either fixed rails which engage the wheels, or cables (or like metallic lines) buried under the paths to be followed. Such track or cable installations are expensive and unduly permanent since routes are thenceforth determined by the installation.

SUMMARY OF THE INVENTION

An object of the present invention is therefore to provide a free ranging un-manned vehicle control system such as to simulate a driver-controlled vehicle with a route to follow.

According to the present invention a vehicle control and guidance system comprises a vehicle, having motive power means for driving the vehicle, steering means for controlling the path of the vehicle, dead reckoning means for determining the position and heading of the vehicle on an incremental basis, electromagnetic direction finding means for providing sequential determinations of the bearing relative to the vehicle of one or more fixed reference targets, means for correcting each dead reckoning determination of vehicle position and heading in dependence upon the reference target-bearing determinations, means for defining a desired route for the vehicle, and means for controlling the motive power means in dependence upon errors between the corrected determination of vehicle position and the desired route.

The means for defining a desired route preferably comprises storage means for storing the route in terms of a series of straight line segments and means for converting the junction of the straight line segments into smooth transitions.

There is preferably provided means for storing for each of said straight line segments, a permissible maximum vehicle speed and a permissible path width, according to the local route conditions.

The dead reckoning means may comprise means for estimating the position and heading of the vehicle after each of a series of time increments, from the position and heading of the vehicle at the beginning of the time increment and in dependence upon the forward and angular velocities of the vehicle during the time increment.

The system preferably comprises means for predicting the bearing of a reference target from the vehicle at the end of a time increment, on the basis of the estimated position of the vehicle at the end of a time increment and the known position of the reference target.

There may be included means for providing a bearing error difference between the predicted bearing of the target and the bearing of the target as determined by the electromagnetic direction finding means, Kalman filter means for producing correction products, being products of the bearing error and Kalman gain factors in respect of each of the position coordinate and the vehicle heading, and means for combining the correction products with the respective estimates of position and heading provided by the dead reckoning means, the results of the combination being best estimates of the position and heading of the vehicle.

There is preferably provided means for applying the best estimates to the dead reckoning means as a basis from which to estimate the vehicle position and heading one time increment later. Means may be provided for generating sequentially the coordinates of reference points on the straight line sequence defining incremental vectors, each such reference point being generated in a time increment corresponding to the maximum permissible speed of the vehicle over an incremental vector. There may also be provided error detecting means for comparing the best estimates of the vehicle position and heading with the position and heading of the nearest incremental vector and producing distance and heading error signals, and means for producing a steering angle demand signal in dependence upon the distance and heading error signals. This error detecting means preferably comprises means for transforming the coordinates of the best estimates of vehicle position and heading into a reference frame having one coordinate axis in alignment with a local incremental vector and having an origin coincident with the reference point to which the local incremental vector is directed.

A speed demand signal for the vehicle may be made dependent upon the number of reference points generated ahead of the vehicle position.

BRIEF DESCRIPTION OF THE DRAWINGS

A vehicle control and guidance system in accordance with the invention will now be described, by way of example, with reference to the accompanying drawings, of which.

It will be apparent that, in this specification the term "dead reckoning means" implies means for navigating based on detection of relative movement between vehicle and ground.

DETAILED DESCRIPTION OF THE PREFERRED EMBODIMENTS

Figure 1:
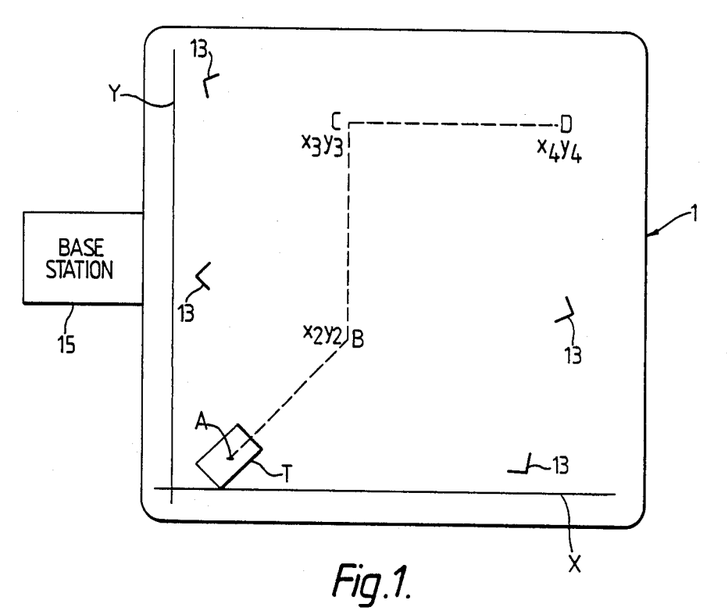
FIG. 1 is a diagrammatic layout of a factory floor area showing a vehicle route.

Referring to the drawings, FIG. 1 shows a factory floor area 1 having coordinate axes X and Y marked on it to provide a coordinate system. The coordinates of a location on this area will be referred to as 'factory coordinates' to distinguish from 'vehicle coordinates' to be explained subsequently.

A vehicle T, which may be a flat, load bearing truck, is required to move, un-manned, around the area 1 between stations A, B, C and D along a route defined by the factory coordinates of these stations. The route shown is, of course, purely for purposes of illustration and may in fact be more or less extensive.

Figure 2:
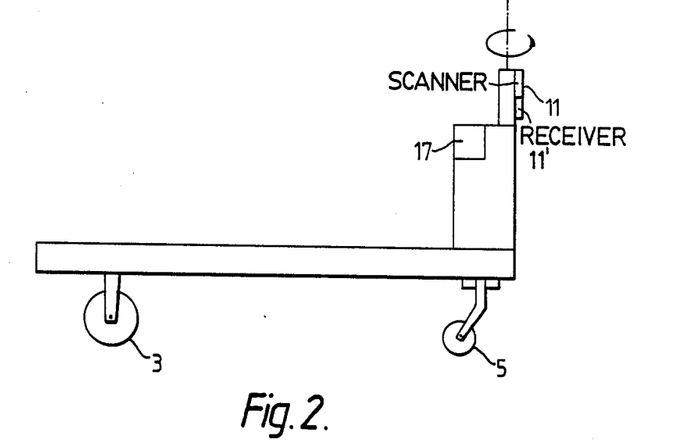
FIG. 2 is a pictoral view of a vehicle to be guided and controlled.

Referring also to FIG. 2 the vehicle includes driving wheels 3 with any necessary differential gearing and a castor wheel 5 at one or both ends which is controllable in steering angle and which incorporates a steering angle transducer (not shown) and a [distance-moved] transducer (not shown) for feedback purposes.

The driving wheels 3 are speed-controlled and supplied by way of a gearbox and DC convertor from a battery 7 in known manner.

Figure 2A:
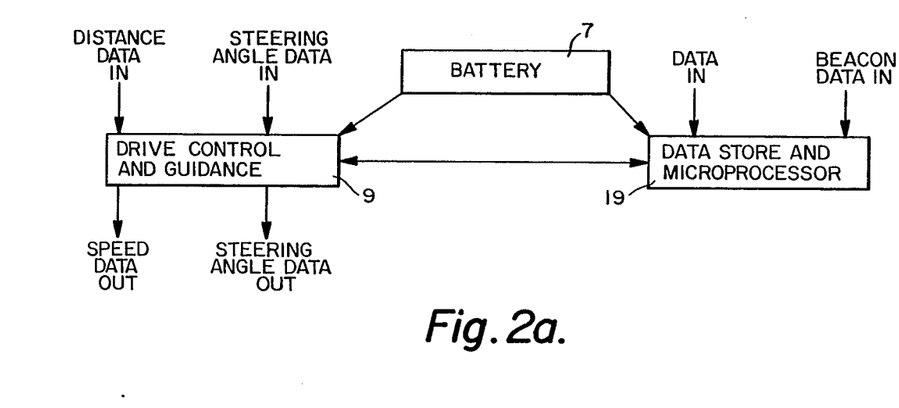
FIG. 2a is a functional block diagram of the drive control and guidance aspects of the system.

The essential features of the vehicle, as shown in FIG. 2a, are that it has a controllable steering angle and speed controlled driving equipment. The actual mechanical arrangement can obviously be optimised for the purposes of the invention but is not critical. Thus steering may alternatively be achieved by differential control of two driving wheels instead of by driven control of a castor wheel. The mechanical construction of the vehicle equipment need not therefore be detailed further.

Drive control and guidance electronics 9 receive distance and steering angle signals from the castor wheel 5 and provide steering angle control signals 29' and speed control signals 29" as will be explained in FIG. 7.

The equipment so far mentioned is necessary for a dead-reckoning navigating system in which the vehicle location is determined on an incremental basis from a knowledge of distance moved and direction taken. Such systems, while satisfactory in some situations where distances are small, can suffer from cumulative faults due to wheel slippage, uneven surfaces, wear etc. Accordingly therefore, it is a feature of the present invention that a supervisory referencing and correcting system is provided based upon the detection of fixed reference points and the location of the vehicle relative to them. The vehicle is provided with a laser source 11 which is mounted to rotate continuously about a vertical axis. The laser beam is narrow in width and extensive in height so as to form a thin vertical line of radiation incident upon any obstructing target. A number of targets 13 are fixed at various positions around the area so that as far as possible one or more can be 'seen' by the vehicle from any position in the area. Of course, in a factory situation equipment and stores are moved around and are likely to obscure one or more of the targets from certain positions. In such circumstances the dead-reckoning system may be, temporarily at least, 'on its own'.

The targets 13 are formed from retro-reflectors which return incident light in the direction whence it came. They may be formed from vertical strips of retro-reflective material, the strips being coded by width or by presence and absence to provide an indication of their identity. They may conveniently be mounted on boards positioned at or above head height to avoid the laser beam being interrupted by objects on the floor. The scanning laser beam may be directed upwards accordingly and may have a vertical angular extent sufficient to encompass the targets at ranges in question.

The laser scanning system is the subject of commonly-owned, pending U.S. patent application Ser. No. 608,242, the contents of which are incorporated herein by reference, and will not be described in greater detail here.

The vehicle incorporates a receiver 11' which receives the reflected beam from a target 13 and provides an indication of the target direction relative to the vehicle heading.

This latter parameter is the angle that the vehicle longitudinal axis makes with the X axis of the factory coordinate system. The 'heading' is not necessarily the direction of travel since the steering wheel may not be straight ahead at the time.

Also included in the vehicle equipment is a microprocessor and data storage facility 19. Amongst the data stored prior to a travel operation is the route 'map' in the form of the coordinates of the points A, B, C and D. The route may include sections which require reduced vehicle speed and the limiting speed for each straight section A to B etc, referred to as vectors, is specified and stored.

In addition to limitations imposed on the speed along each route vector it may be that the tolerance on transverse vehicle displacement from the route line varies from vector to vector. There is thus in effect a free path width for each vector beyond which the vehicle must not stray and this pathwidth may change at vector junctions. The path width for each vector is also stored prior to each travel operation.

The above information, route identification (coordinates of junction points), permissible speed in each vector and path width for each vector, may be stored in the vehicle data store by manual insertion of a program or may be communicated from a base station 15 to a communication beacon 17 on the vehicle, the beacon accepting and passing on the data to the vehicle data store and microprocessor 19. The communication unit may regularly inform the base station of the current vehicle position or may be interrogated for the same purpose.

Figure 3:
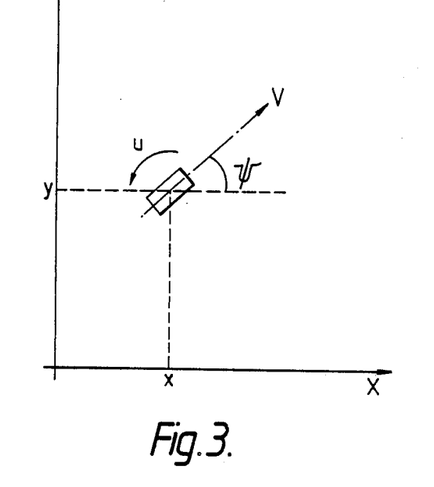
FIGS. 3 and 4 are diagrams illustrating the position and orientation of the vehicle on the factory floor area in relation to factory coordinate axes.

The operation and processing involved will be explained with reference to the subsequent Figures additionally. FIG. 3 illustrates the vehicle navigation coordinates, the position being given by the x and y 'factory' coordinates, the vehicle heading being the angle $\psi$, i.e. the angle between the vehicle axis and the X axis, the forward velocity being V, and the rotation rate, i.e. angular velocity of the vehicle being U.

Figure 4:
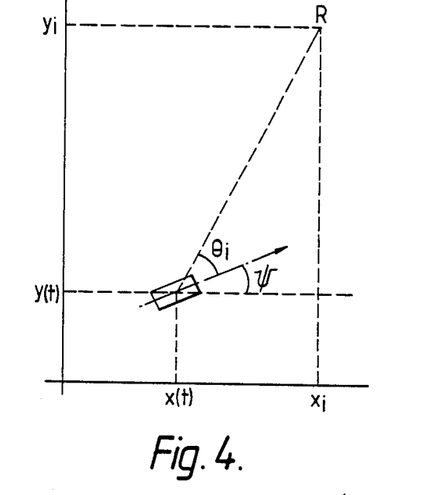

FIG. 4 illustrates the vehicle-target coordinates additionally. The target reflector R, at factory coordinates $x_i$ and $y_i$ is detected at an angle $\theta_i$ to the vehicle heading, the vehicle itself having position coordinates x and y at a particular time 't'.

Figure 5:
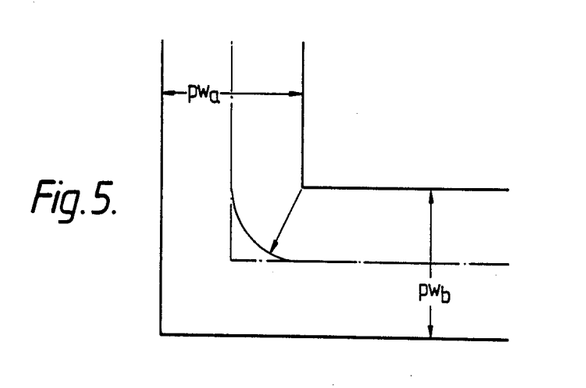
FIGS. 5 and 6 show diagrammatically the route of a vehicle, the free path width of the vehicle and bends in the route.
Figure 6:
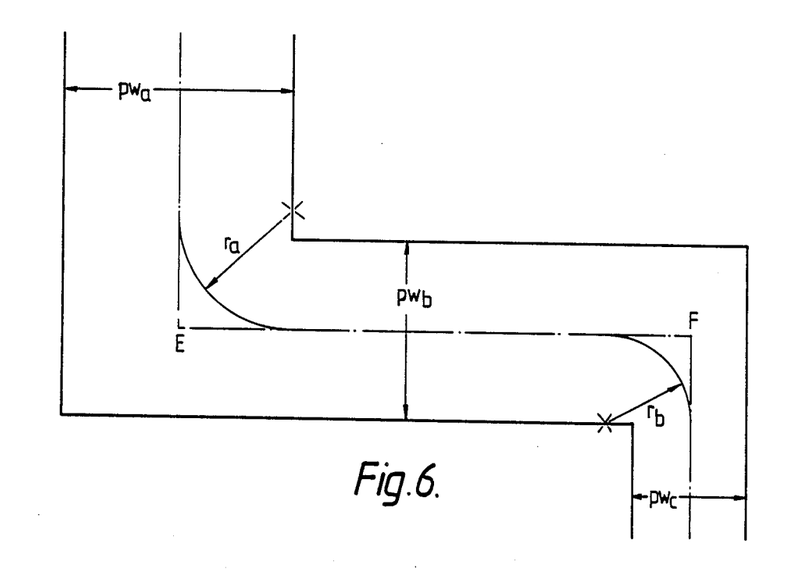

FIG. 2 shows the junction of two vectors where the free path widths as determined by the stored data, are the same. It is essential for smooth operation that the route at vector junctions is continuous rather than angular and consequently a curved path is calculated to fit the intersection. A requirement is that the curvature shall be as small as possible (i.e. maximum radius of curvature) to reduce forces on the vehicle traversing the bend, while at the same time the path width shall nowhere be less than the smaller of the two path widths. In FIG. 5 the radius of the curve is therefore half of the common path width. In FIG. 6 however, showing junctions between vectors of different path width, the fitted curves have radii $pw_a/2$ and $pw_b/2$ at the points E and F respectively.

Figure 7:
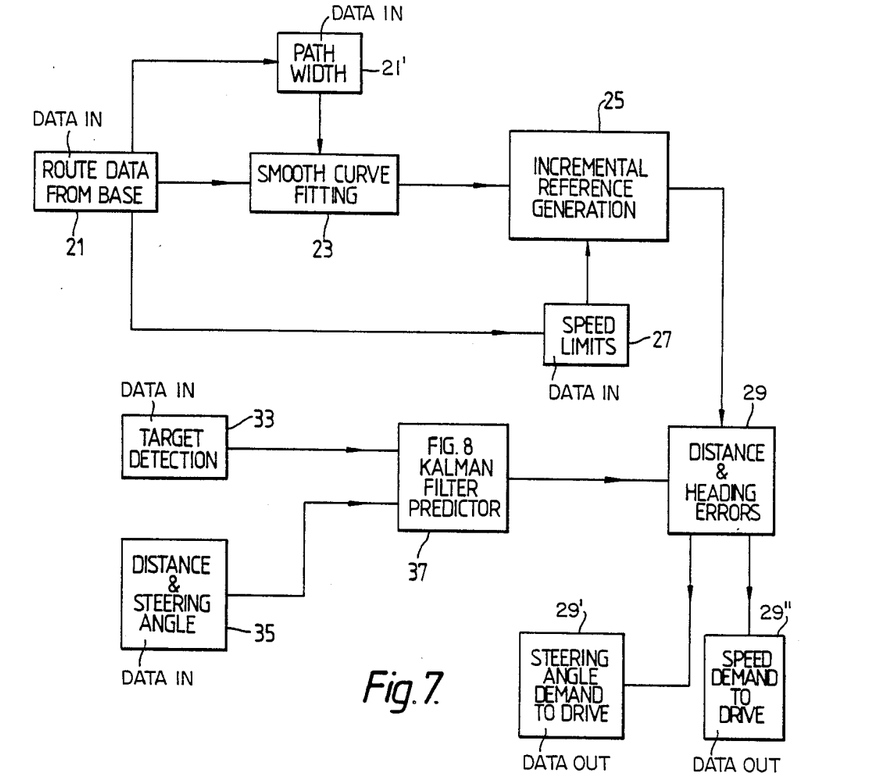
FIGS. 7 and 7a are block and flow chart diagrams of the system.
Figure 7A:
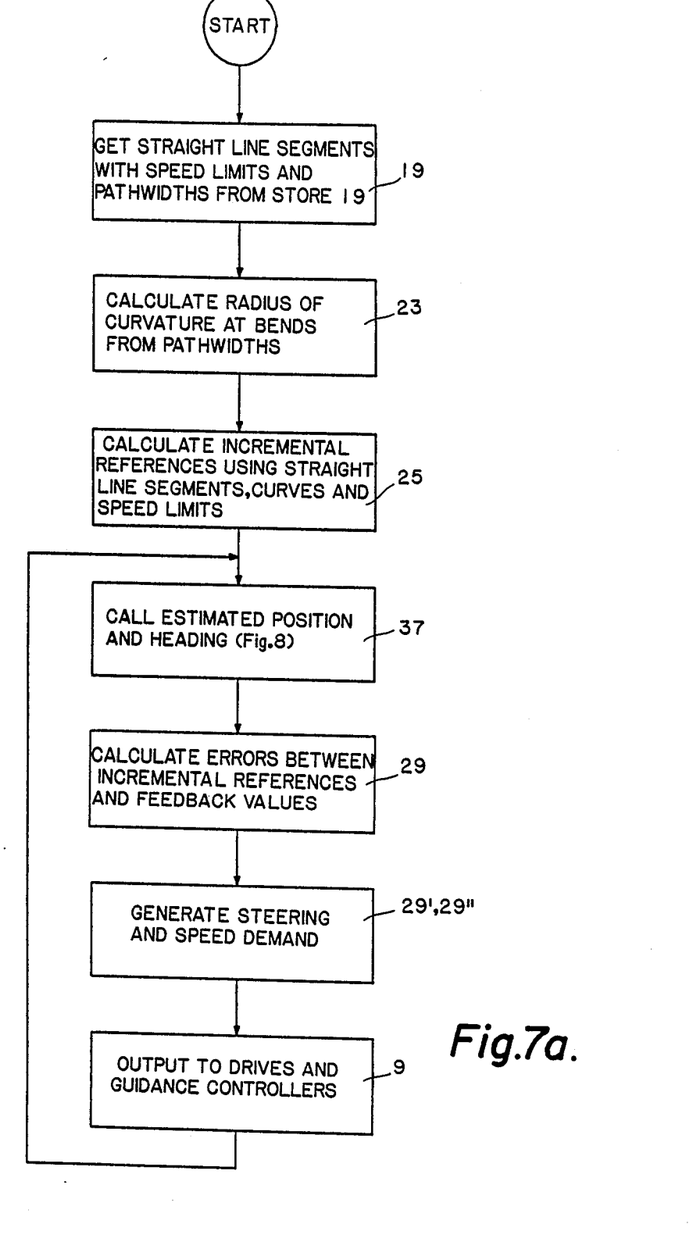

Referring now to FIGS. 7 and 7a, they illustrate in block schematic and flowchart form respectively the navigation processing performed on the vehicle.

Data indicating the coordinate points on the route, as represented by block 21, and data indicating the path widths of the various route vectors, as represented by block 21', are received and stored in the processor 19 which then calculates at block (23) the smooth curves necessary at the vector junctions, as mentioned previously, on the basis of the path widths. The constant radius curves suggested in FIGS. 5 and 6 are in fact not possible to achieve since a transition between a straight path and a circular curve would involve an instantaneous change from zero to a finite angular velocity, and thus infinite acceleration and force. An ideal curve would involve a linear increase and then decrease of curvature through the bend.

An approximation to this curve is provided by the following equation:

$$\underline{x}(\alpha) = (1-\alpha)^2 \underline{x_1} + 2\alpha(1-\alpha)\underline{x_2} + \alpha^2 \underline{x_3}$$

where
- $\alpha$ is that fraction into which the bend is divided, i.e. tenths, fifteenths, or whatever,
- $\underline{x_2}$ is a vector representing the coordinates of a junction point;
- $\underline{x_1}$ and $\underline{x_3}$ are vectors representing the coordinates of points at the beginning and end of the curve; and
- $\underline{x}$ is the general vector representing the coordinates of points on the curve after each fraction $\alpha$.

Thus by inserting one-tenth, two-tenths, three-tenths for $\alpha$, the coordinates of successive points on the curve are obtained. This process is effected at 23 in FIG. 7 using a value of $\alpha$ determined as will be explained.

This principle of incremental construction of the curves is in fact common to the straight portions as well, the successive coordinates of points on the straight portion being given by $$\underline{x}(\alpha) = (1-\alpha)\underline{x_0} + \alpha\underline{x_1}$$

where $\underline{x_0}$ and $\underline{x_1}$ are the coordinates of points at the beginning and end of the straight portion.

While the length of the straight portion might commonly be 20 or 30 meters the length of each section, each incremental vector that is, would commonly be perhaps 5 cms. The fraction $\alpha$ would then be about 1/500.

This generation of the incremental vectors is performed in block 25 and employs initial data (27) defining the speed limits applicable to the various route vectors.

Each incremental vector is defined by the coordinates of the point (the 'reference point') at its leading end. The generation of each such reference point occurs once in a basic time interval (at conveniently 20 Hz) which is derived from a clock pulse generator of the system. Since the speed (maximum) for each vector is predetermined and the time interval is fixed, the maximum length of each incremental vector is determined. At a speed of 1 m/sec therefore, the incremental vector length is 5 cms. Having thus determined the maximum length this can be reduced slightly to make the number of incremental vectors in the route vector an integral number, of which $\alpha$ (above) is the inverse.

It will be apparent that if the incremental vector length is reduced from its maximum permissible, the speed of the vehicle for that portion of the route will be reduced accordingly. Dynamic control of the speed is thus provided.

In constructing the curve as explained above, by calculation of successive reference points, the incremented reference heading $\psi_r$ is determined as the angle of the line between successive reference points (relative to the factory X axis).

The reference points so calculated, which do of course define the required route as opposed to the actual route followed, are generated once per basic interval and stored for comparison with the 'actual' positions taken by the vehicle. These 'actual' positions are, in fact, estimates derived from the dead reckoning system as checked and corrected by the laser/target reference system.

If the generated reference points advance ahead of the vehicle, due to inertia etc., the difference in position between the latest reference point and the vehicle may be considered as an error distance which the vehicle tries to reduce. The greater this error distance the greater should be the speed of the vehicle (within the limit set for the particular route vector or bend) to try to reduce it. Conversely, the speed should be reduced if the generated reference points are only just ahead of the vehicle position. This last situation will obtain when the vehicle is approaching a stopping station at the end of a route vector. The number of reference points 'lying in wait' is thus an indication of speed requirement and the vehicle drive motor is controlled accordingly.

The generated reference points and the associated incremental reference heading $\psi$ are passed, one pair at a time, for position and heading error determination (29).

The estimated vehicle position and heading is provided by a Kalman filter predictor process 37 in FIG. 7. This employs target detection inputs $\theta_i$ (FIG. 4) derived from the laser/reflector system 33. Distance moved by the vehicle and steering angle signals are obtained from transducers referred to previously and indicated in FIG. 7 at 35. The Kalman predictor process itself (37) is illustrated in greater detail in the block diagram of FIG. 8 and the flowchart of FIG. 8a.

Figure 8:
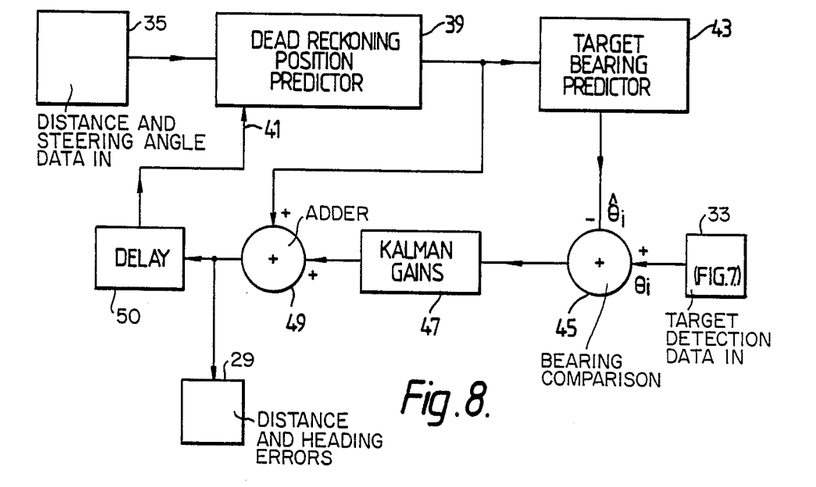
FIGS. 8 and 8a are block and flow chart diagrams of a Kalman filter process of the system.
Figure 8A:
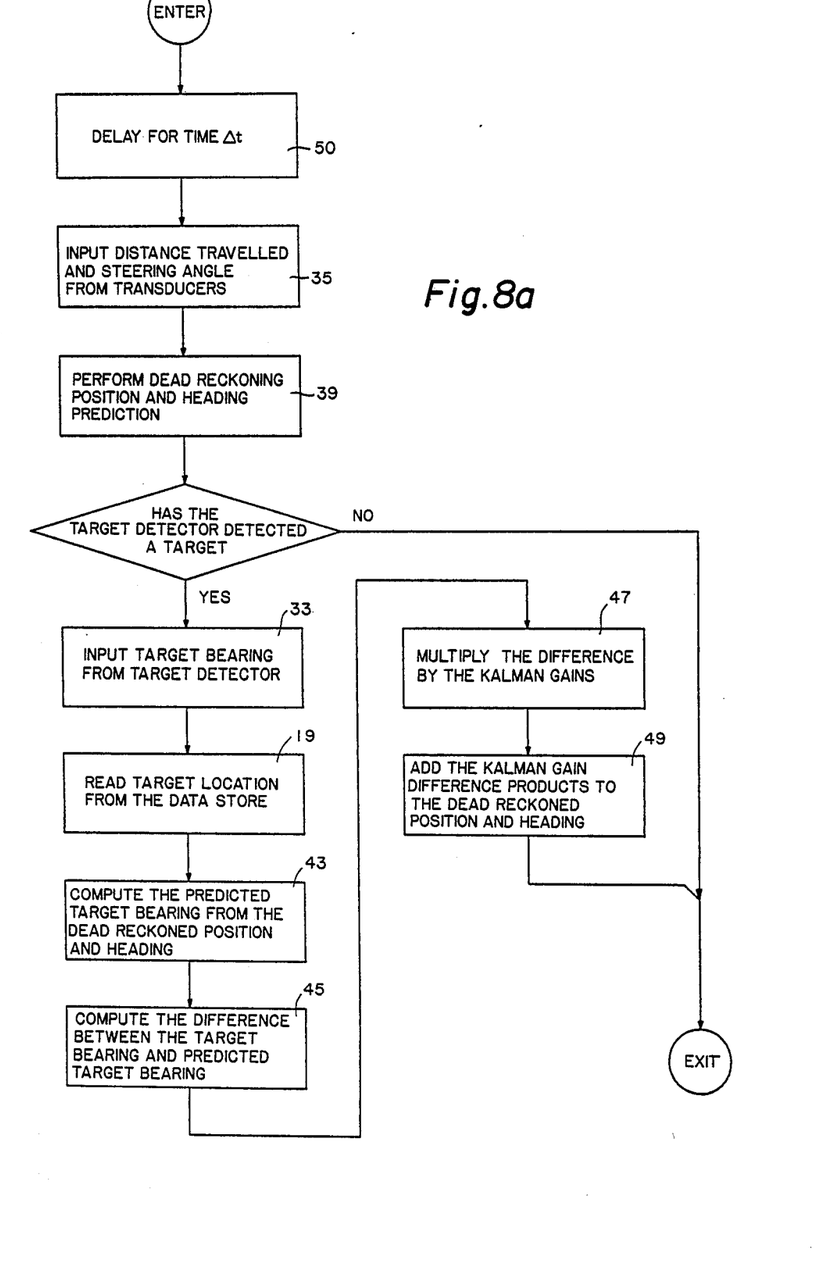

Referring to FIG. 8, the first process to be performed is the estimation at block 50 of position and heading at the end of one basic time interval ($\Delta t$) given the forward and rotational speeds of the vehicle during that interval and the position, either actual or estimated, at the beginning of the interval.

The transducer inputs to the position predictor process are the steering angle $\phi$ picked off the steering castor, and the distance travelled by that castor wheel produced as distance-counting pulses. The distance increment and the time interval $\Delta t$ give the speed in the direction of the castor wheel from which the forward speed V of the vehicle, along its heading, is obtained as a product with the cosine of the steering (castor) angle $\phi$. The angular velocity of the vehicle, U, is derived from the products of the castor wheel velocity and the sine of the steering angle $\phi$ in accordance with the geometry of the vehicle wheels. These velocities V and U are calculated in each time interval on the assumption that the velocities and steering angle are constant for the (short) time interval $\Delta t$.

The equations used in the process of the position predictor 39 of FIG. 8 are derived as follows. The rates of change of the position coordinates x and y, and of the heading angle $\psi$ can be seen from inspection of FIG. 3 to be given by:

$$\dot{\psi} = U$$

$$\dot{x} = V \cos \psi$$

$$\dot{y} = V \sin \psi$$

By the integration of these equations over the period $\Delta t$ the following equations are derived:

$$\psi(t+\Delta t) = \psi(t) + U.\Delta t$$

$$x(t+\Delta t) = x(t) + V(\sin(\psi(t) + U.\Delta t) - \sin(\psi(t)))\Delta t/U.\Delta t$$

$$y(t+\Delta t) = y(t) - V(\cos(\psi(t) + U.\Delta t) - \cos(\psi(t))).\Delta t/U.\Delta t$$

The first of these is expressed as: the value of $\psi$ at time $(t+\Delta t)$ is equal to the value of $\psi$ at time t plus the angle through which the vehicle has rotated in the time interval $\Delta t$. In the second and third equations t and $(t+\Delta t)$ have the same significance as in the first.

These equations may be re-written for estimated values as:

$$\hat{\psi}(t+\Delta t/t) = \hat{\psi}(t/t) + U.\Delta t$$

$$\hat{x}(t+\Delta t/t) = \hat{x}(t/t) + V(\sin(\hat{\psi}(t/t) + U\Delta t) - \sin \hat{\psi}(t/t))/U$$

$$\hat{y}(t+\Delta t/t) = \hat{y}(t/t) - V(\cos(\hat{\psi}(t/t) + U.\Delta t) - \cos \hat{\psi}(t/t))/U$$

The 'hat' over a parameter indicating an estimated value, and the symbol "/t" meaning "evaluated at time t".

It may be seen that these equations are sufficient to estimate the position and heading of the vehicle at time $(t+\Delta t)$ knowing the estimated position and heading at time t. The output of block 39 is thus the estimated coordinates x and y and the estimated heading $\psi$ of the vehicle after a further time interval $\Delta t$, and, but for the input 41, based only on the dead reckoning system of distance travelled and angle moved through.

From FIG. 4 the estimated angle of a target reflector R may be obtained in terms of the vehicle heading $\psi$ and the coordinates of the vehicle and the target as:

$$\hat{\theta}_i(t+\Delta t/t) = \tan^{-1} \frac{y_i - \hat{y}(t+\Delta t/t)}{x_i - \hat{x}(t+\Delta t/t)} - \hat{\psi}(t+\Delta t/t)$$

where $\hat{\theta}_i$ is the estimated target angle at time $(t+\Delta t)$ evaluated at time t. The coordinates $x_i$ and $y_i$ of the target are predetermined from the layout of the targets on the factory floor. The estimated values $\hat{x}$ and $\hat{y}$ of the vehicle are derived from process 39 and also the estimated value $\hat{\psi}$ of the heading. The equation is thus processed in a target bearing predictor 43 which produces the output $\hat{\theta}_i$.

The output of the laser target detection system 33 provides an accurate observation of the target angle $\theta_i$ which is differenced with the estimated value $\hat{\theta}_i$ in a process 45 to give a target estimation error $\theta_i - \hat{\theta}_i$.

This error signal is processed by the Kalman filter 47 which effectively produces products of the error with respective Kalman gain factors $k_\psi$, $k_x$, and $k_y$. These correction products are then added in process 49 to the dead-reckoning predictions of process 39 in accordance with the following equations to give corrected estimates of the vehicle heading and position:

$$\hat{\psi}(t+\Delta t/t+\Delta t) = \hat{\psi}(t+\Delta t/t) + k_\psi(\theta_i - \hat{\theta}_i)$$

$$\hat{x}(t+\Delta t/t+\Delta t) = \hat{x}(t+\Delta t/t) + k_x(\theta_i - \hat{\theta}_i)$$

$$\hat{y}(t+\Delta t/t+\Delta t) = \hat{y}(t+\Delta t) + k_y(\theta_i - \hat{\theta}_i)$$

The derivation of Kalman correction products and the operation of Kalman filters is given in the book "Optimisation of Stochastic Systems" by M. Aoki, published by Academic Press 1967. Thus corrected estimates of heading and position at time $(t+\Delta t)$ evaluated at that time are obtained from estimates of heading and position obtained at time t and corrected by the Kalman filter process. These best estimates are output to the error determining process 29 of FIG. 7 but are also applied as 'present' inputs (41) to the position predictor 39 of FIG. 8 from which to predict the next reference point. Thus in the absence of one or more target reference corrections, due, for example, to obscuring of the targets, the next reference point is predicted by dead reckoning from the last reference point that had the benefit of target-detection correction.

Referring back to FIG. 7, the determination of distance and heading errors will now be described. The two inputs to process 29 are (a) the generated series of reference points defining the ideal route, and (b) the best estimate of vehicle heading and position derived from the Kalman process of FIG. 8.

Figure 9:
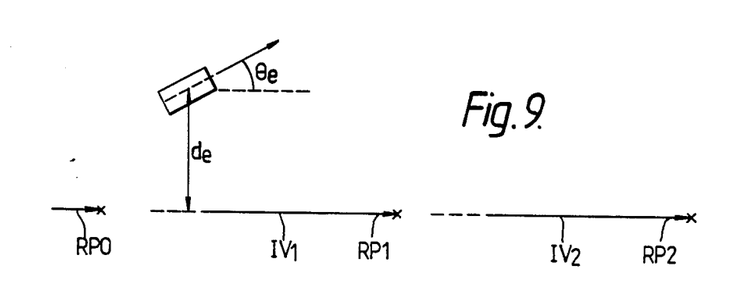
FIG. 9 is a diagram showing displacement and heading errors of the vehicle.

Referring to FIG. 9, this shows successive incremental vectors IV1 and IV2 and their associated reference points RP1 and RP2 as generated in accordance with process 25 (FIG. 7). Errors in the navigation of the vehicle T are determined as the perpendicular distance $d_e$ between the centre of the vehicle and the local incremental vector, and the angular error $\theta_e$ between the heading of the vehicle and the direction of the local incremental vector.

Figure 10:
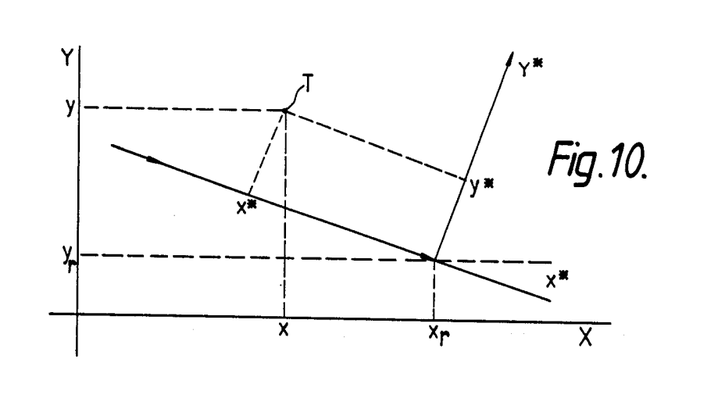
FIG. 10 is a diagram showing a transformation between 'factory frame' coordinates and 'vehicle frame' coordinates for the determination of positional errors.

Measurement of these errors $d_e$ and $\theta_e$ are achieved by a transformation of the actual vehicle position in factory coordinates to a position in a vehicle reference frame in which the origin is at the reference point of the local incremental vector and the new X axis coincides with the local incremental vector. This transformation is illustrated in FIG. 10 in which X and Y are the factory coordinate axes, X* and Y* are the vehicle frame axes, $x_r$ and $y_r$ are the coordinates in the factory frame of the local incremental vector reference point, x, y are the coordinates of the vehicle in the factory frame and x* y* are the vehicle coordinates in the vehicle frame.

the angle $\psi_r$ is the heading of the incremental vector relative to the factory frame. From FIG. 9 the following transformations are derived by simple geometry:

$$x^* = (x-x_r)\cos\psi_r + (y-y_r)\sin\psi_r$$

$$y^* = (y-y_r)\cos\psi_r - (x-x_r)\sin\psi_r$$

In this vehicle reference frame it may be seen that the distance error $d_e$ is the y* coordinate of the vehicle centre and the angle error $\theta_e$ is the transformation angle $\psi_r$ directly.

When the vehicle passes the local reference point $x_r$, $y_r$ the polarity of x* will change from negative to positive. This change will initiate discarding of the current vehicle reference frame and re-establishing it with origin on the succeeding reference point and x* axis aligned with the next incremental vector. It will be seen therefore that the vehicle frame steps along synchronously with the vehicle.

The error values $d_e$ and $\theta_e$ are then used to derive a steering-angle-demand signal $\theta_d$ as a direct function of these error values. The demanded angular velocity $U_d$ is first derived as:

$$U_d = K_1 d_e + K_2 \theta_e$$

where $K_1$ and $K_2$ are gain functions defined by the dynamics of the vehicle itself. The demand steering angle is then calculated from the vehicle geometry and the demanded forward speed of the vehicle.

As mentioned above, speed of the vehicle is controlled by measuring the number of incremental vectors between the vehicle and the last one generated. This last generated one will always be ahead of the vehicle and will appear to 'pull' the vehicle along as if an elastic band connects the vehicle to the last position reference generated.

From a stationary position the reference points will be generated at a linear rate away from the 'rest' station and will in effect stretch the abovementioned elastic. The vehicle will accelerate in accordance with the error distance to the latest reference point and dependent upon its inertia and power, and gradually the error will reduce until a steady state is reached where the vehicle speed is equal to the rate of advance of the reference points.

Reference point speed and therefore vehicle speed can be altered dynamically during travel along a defined trajectory by altering the incrementing distance (i.e. by varying $\alpha$ in the above algorithm) between successive reference points.

When the generation of incrementing vectors and reference points is complete, the final incrementing vector will terminate on the final stopping position demanded by the original route specified in coordinate position defining route vectors. The vehicle speed will slow down as the distance error decreases. By shaping the distance-error/demanded-speed relationship the speed is controlled so that the final point is reached without overshoot. The vehicle frame is again directly applicable here as the x* coordinate is the 'distance-to-go' in that frame and this can be monitored without further calculation.

The electromagnetic direction-finding means is, in the above embodiment a laser system providing direction sensing by means of a narrow laser beam scanning in azimuth. It is however envisaged that radar beams could be employed providing accurate direction finding by phase comparison techniques. In addition, the reflectors above could be replaced by transponders with coded emissions.

We claim:

1. A vehicle control and guidance system comprising:
   (A) a vehicle including
      (i) motive power means for driving said vehicle having a position and a heading along a path,
      (ii) dead reckoning means for estimating the position and the heading of said vehicle along the path,
      (iii) steering means for controlling the path of said vehicle,
      (iv) route data storage means for storing data defining a desired route for said vehicle, and
      (v) computing means having position comparison means for comparing the position of said vehicle as determined by said dead reckoning means with the desired route, and for controlling said steering means in dependence upon the result of the comparison;
   (B) an electromagnetic direction finding system including
      (i) a plurality of fixed reference targets having fixed locations, and
      (ii) transmitting and receiving means mounted on said vehicle for making periodic determinations of a detected bearing relative to said vehicle of at least one of said fixed reference targets; and
   (C) said computing means further having
      (i) means for periodically receiving from said direction finding system a said detected bearing of a fixed reference target,
      (ii) target storage means for storing the fixed locations of said fixed reference targets,
      (iii) means for deriving from said dead reckoning means and from the stored fixed location of the said fixed reference target an estimated bearing of the said fixed reference target,
      (iv) bearing comparison means for comparing the detected bearing determined by said transmitting and receiving means with the estimated bearing derived from said dead reckoning means, and for generating a bearing error, and
      (v) means for correcting the estimated position and the estimated heading of said vehicle determined by said dead reckoning means in dependence upon the bearing error determined by said bearing comparison means.

2. A vehicle control and guidance system comprising:
   (A) a vehicle including
      (i) motive power means for driving said vehicle having a position and a heading along a path,
      (ii) dead reckoning means for estimating the position and the heading of said vehicle along the path,
      (iii) steering means for controlling the path of said vehicle,
      (iv) route data storage means for storing data defining a desired route for said vehicle, and
      (v) computing means having position comparison means for comparing the position of said vehicle as determined by said dead reckoning means with the desired route, and for controlling said steering means in dependence upon the result of the comparison;
   (B) a laser target detection system including
      (i) a plurality of fixed reference target reflectors having fixed locations,
      (ii) laser beam scanning means mounted on said vehicle for scanning said target reflectors along a scanning direction,
      (iii) laser beam detection means mounted on said vehicle for detecting laser beam reflections from said target reflectors, said computing means having means for determining a detected bearing of a said target reflector from the scanning direction at the instant of detection of a said laser beam reflection; and (C) said computing means further having
(i) means for periodically receiving from said laser target detection system a said detected bearing of a said target reflector,
(ii) target storage means for storing the fixed locations of said fixed reference target reflectors,
(iii) means for deriving from said dead reckoning means and from the stored fixed location of the said fixed reference target reflector an estimated bearing of the said fixed reference target reflector,
(iv) bearing comparison means for comparing the detected bearing determined by said target detection system with the estimated bearing derived from said dead reckoning means, and for generating a bearing error, and
(v) means for correcting the estimated position and the estimated heading of said vehicle by said dead reckoning means in dependence upon the bearing error determined by said bearing comparison means.

3. A vehicle control and guidance system according to claim 2, wherein said route data storage means for defining a desired route comprises means for storing said route in terms of a series of straight line segments, and said computing means comprises means for converting a junction of said straight line segments into smooth transitions for storage by said route data storage means.

4. A vehicle control and guidance system according to claim 3, wherein said route data storage means comprises means for storing, for each of said straight line segments, a permissible maximum vehicle speed and a permissible path width, according to the local route conditions.

5. A system according to claim 4, wherein said means for converting said junction into smooth transitions comprises means for calculating the radius of curvature of a transition as not less than half the value of the path width and, where there are different path widths at the junction, half the value of the greater of the two path widths.

6. A system according to claim 2, wherein said dead reckoning means comprises means for estimating the position and the heading of said vehicle after each of a series of time increments, the position and the heading of said vehicle after each time increment being estimated from the position and the heading of said vehicle at the beginning of the said time increment and in dependence upon the forward and angular velocities of said vehicle during the said time increment.

7. A system according to claim 6, wherein said computing means comprises means for predicting the bearing of a said reference target reflector from said vehicle at the end of a said time increment, on the basis of the said estimated position of the vehicle at the end of said time increment and the known position of said target reflector.

8. A system according to claim 7, wherein said computing means comprises means for providing a bearing error difference between the predicted bearing of said target reflector and the bearing of said target reflector as determined by said laser target detection system, Kalman filter means producing correction products, said correction products being products of the said bearing error difference and Kalman gain factors in respect of co-ordinates of the vehicle position and the vehicle heading, and means for combining said correction products with the respective estimates of vehicle position and heading provided by said dead reckoning means, the results of the combination being best estimates of the position and heading of said vehicle.

9. A system according to claim 8, wherein said best estimates of the position and the heading of said vehicle are employed by said dead reckoning means as current vehicle position and heading for estimation of vehicle position and heading one said time increment later.

10. A system according to claim 4, wherein said computing means comprises means for generating sequentially the co-ordinates of reference points on said straight line segments defining incremental vectors, each such reference point being generated in a time increment corresponding to the maximum permissible speed of the vehicle over a said incremental vector.

11. A system according to claim 4, further comprising means for generating sequentially the co-ordinates of reference points on said straight line segments defining incremental vectors, each such reference point being generated in a time increment corresponding to the maximum permissible speed of the vehicle over a said incremental vector, error detecting means for comparing the said corrected vehicle position and heading with the position and heading of the nearest incremental vector and producing distance and heading error signals, and means for producing a steering angle demand signal in dependence upon said distance and heading error signals.

12. A system according to claim 11, wherein said error detecting means comprises means for transforming the co-ordinates of said corrected vehicle position and heading into a reference frame having one co-ordinate axis in alignment with a local incremental vector and having an origin coincident with the reference point to which the local incremental vector is directed.

13. A system according to claim 11, wherein said computing means comprises means for providing a speed demand signal for the vehicle dependent upon the number of reference points generated ahead of the vehicle position.

14. A vehicle control and guidance system comprising:
(A) a vehicle including
(i) motive power means for driving said vehicle having a position and a heading along a path,
(ii) steering means for controlling the path of said vehicle,
(iii) route data storage means for storing data defining a desired route for said vehicle,
(iv) computing means, and
(v) dead reckoning means having
(a) position transducer means for providing a vehicle displacement signal,
(b) heading transducer means for providing a vehicle heading signal, and
(c) position and heading estimating means comprised within said computing means, and responsive to said vehicle displacement signal and to said vehicle heading signal, for estimating the position and the heading of said vehicle after each of a series of time increments, the position and the heading of said vehicle after each time increment being estimated from the position and the heading of said vehicle at the beginning of said time increment and in dependence upon the forward and angular velocities of said vehicle during the said time increment;

(B) a laser target detection system including
  (i) a plurality of fixed reference target reflectors having fixed locations,
  (ii) laser beam scanning means mounted on said vehicle for scanning said target reflectors along a scanning direction,
  (iii) detection means mounted on said vehicle for detecting laser beam reflections from said target reflectors,
  (iv) bearing determination means comprised within said computing means for determining a detected bearing of a said target reflector from the scanning direction at the instant of detection of a said laser beam reflection; and (C) said computing means having
  (i) location storage means for storing the fixed locations of said fixed reference target reflectors,
  (ii) bearing prediction means for providing a predicted bearing of a said target reflector from said vehicle at the end of a said time increment, said bearing prediction means employing the said estimated position and the heading of said vehicle at the end of said time increment and the fixed location of the said target reflector derived from said location storage means,
  (iii) bearing error detection means for determining a bearing error between the predicted bearing and the detected bearing determined by said bearing determination means, and
  (iv) Kalman filter processing means having
    (a) means for producing correction products, said correction products being products of the said bearing error and Kalman gain factors in respect of coordinates of the vehicle position and the vehicle heading, and
    (b) means for combining said correction products with the respective estimates of vehicle position and heading provided by said dead reckoning means, the results of the combination being best estimates of the position and the heading of said vehicle; and (D) said computing means including means for comparing said best estimates of the position and the heading of said vehicle with said desired route, and for controlling said steering means accordingly.

15. A vehicle control and guidance system according to claim 14, wherein said route data storage means for defining a desired route comprises means for storing said route in terms of a series of straight line segments, and said computing means comprises means for converting junctions of said straight line segments into smooth transitions for storage by said data storage means.

16. A vehicle control and guidance system according to claim 15, wherein said data storage means comprises means for storing, for each of said straight line segments, a permissible maximum vehicle speed and a permissible path width, according to the local route conditions.

17. A system according to claim 16, wherein said means for converting said junctions into smooth transitions comprises means for calculating the radius of curvature of a transition as not less than half the value of the path width and, where there are different path widths at the junction, half the value of the greater of the two path widths.

18. A system according to claim 14, wherein said best estimates of the position and the heading of said vehicle are employed by said dead reckoning means as current vehicle position and heading for estimation of vehicle position and heading one said time increment later.

19. A system according to claim 16, wherein said computing means comprises means for generating sequentially the coordinates of reference points on said straight line segments defining incremental vectors, each such reference point being generated in a time increment corresponding to the maximum permissible speed of the vehicle over a said incremental vector.

20. A system according to claim 19, wherein said computing means further comprises error detecting means for comparing said best estimates of the vehicle position and heading with the position and heading of the nearest incremental vector and producing distance and heading error signals, and means for producing a steering angle demand signal in dependence upon said distance and heading error signals.

21. A system according to claim 20, wherein said error detecting means comprises means for transforming the coordinates of said best estimates of vehicle position and heading into a reference frame having one coordinate axis in alignment with a local incremental vector and having an origin coincident with the reference point to which the local incremental vector is directed.

22. A system according to claim 20, wherein said computing means comprises means for providing a speed demand signal for the vehicle dependent upon the number of reference points generated ahead of the vehicle position.

* * * * *